Patented Mar. 29, 1938

2,112,387

UNITED STATES PATENT OFFICE 2,112,387

PROCESS FOR MAKING A CATALYST

William J. Sweeney and William E. Spicer, Baton Rouge, La., assignors to Standard Oil Development Company, a corporation of Delaware No Drawing. Application January 28, 1936, Serial No. 61,176

1 Claim. (Cl. 23—233)

In catalytic processes in which temperatures upwards of 900° F., and up to about 2000° F., and flowing streams of reactants are employed, considerable difficulty in encountered with the catalyst when it is employed as a packing for the reaction zone. In such processes the catalysts which have been found effective have been found to be lacking in mechanical strength and therefore to disintegrate too rapidly.

In order to strengthen such catalysts it has been the custom to deposit them on solid carriers of great mechanical strength such as pumice, quartz, metal balls, etc. This procedure has the disadvantage that in such catalysts there is only a thin layer of active material which readily peels off after a relatively short time of usage.

We have found that catalysts of the active type of great mechanical strength can be produced without the employment of solid carriers by combining with the catalyst two or more substances capable of reacting with each other to form a solid compound of high mechanical strength having a melting point considerably above the temperature at which the reaction in which the catalyst is to be employed is carried out, preferably above 2000° F., and heating the mixture to a sufficiently high temperature above the temperature of the reaction in which it is to be employed and for a sufficiently long time to effect a substantial increase in strength, presumably by causing the high melting compound to be formed in sufficient amounts to exercise a binding effect.

The substances added to the catalyst should be employed only in such amounts that the compound formed by their reaction constitutes a minor component of the catalyst, preferably not more than 10% thereof. The reason for this is that too extensive a reaction between such substances serves to effect a partial, often substantial reduction in the activity of the catalyst while only a relatively low degree of reaction will impart the desired strength. In most cases one of these reactive substances is already present in the catalyst, usually as a major component thereof, thereby necessitating the addition of only a small amount of the other reactive component in order to effectuate the process of the present invention.

The types of substances which are capable of reacting with each other to form high melting compounds may be divided into two general classes: those which combine chemically by reason of one being acidic and the other being basic in character and those which combine with each other to form double compounds of an additive nature. As illustrative of the first type may be mentioned magnesia and alumina which combine to form magnesium aluminate. As illustrative of the second group may be mentioned magnesia and sodium fluoride which are capable of combining to form a double fluoride.

The reactive substances added or at least one of them will in some cases have a melting point not in excess of about 1500° F. and this is desirable in order that the admixture and reaction of the reactive components may be facilitated. By far the greater number of reactive substances added, however, have melting points higher than 1500° F. Acid substances according to the present invention are those substances or their compounds which give an acid reaction in water solution or which in a chemical compound constitute or occur in the anion. Basic substances according to the present invention are those which in water solution give an alkaline reaction or, in a chemical compound, constitute or occur in the cation.

As examples of acid substances may be mentioned amphoteric oxides such as alumina, oxides and acids of metals of Group 6 of the periodic system, silica, oxides of bismuth, tin, lead, antimony, cobalt, arsenic, and vanadium, and oxides and acids of phosphorus and boron.

As examples of basic substances to be used in the practice of the present invention may be mentioned the oxides and other compounds of the alkaline earth metals, and oxides and other compounds of the alkali metals where the latter are not objectionable in the catalyst.

Typical of the substances which will combine with metal oxides to form double compounds are fluorides such as sodium fluoride and silicates such as sodium silicate.

The catalytic reactions in which the catalysts obtainable according to our invention exhibit their greatest utility are as stated before, those in which the reaction temperature is upwards of 900° F. Among these may be mentioned the reaction between the steam and hydrocarbons for the production of hydrogen, the cracking of hydrocarbons for the production of olefines, diolefines and acetylenes, the dehydrogenation of hydrocarbons, the polymerization of unsaturated normally gaseous hydrocarbons to aromatics, the destructive hydrogenation of distillable carbonaceous materials in the upper end of the operative temperature range of 300° C. to 700° C., the synthesis of methanol, and similar reactions.

In any of these reactions, the catalysts which have been found to exhibit the greatest activity contain one or more of the acid or basic substances or both employed according to the present invention. For example, for the methane-steam reaction catalysts composed of a metal of the iron group, usually nickel, and one or more of the oxides of alumina, magnesium, chromium, tungsten, silicon, and uranium or a clay containing oxides of both a basic and acid character have been found satisfactory. For the catalytic dehydrogenation of hydrocarbons, catalysts containing oxides of metals of Group 6 of the periodic system, phosphates and difficultly reducible oxides of metals of Group 4 of the periodic system have been employed. For destructive hydrogenation and for the methanol synthesis, catalysts containing a large variety of difficultly reducible oxides of both basic and acid character have been proposed.

Where the catalyst mixture, as such, contains substances of acid and basic character in large amounts its strength can, of course, be improved by heating to the necessary temperature to cause these substances to react without the addition of any other substance. It is practically impossible to control the heating step in such a case, however, so as to avoid a decrease in activity of the catalyst due to a too extensive reaction of the reactive components. This is especially true where, as in the case of many common dehydrogenation catalysts, the acidic reactive component is the catalytically effective ingredient and is present in a relatively small amount. In such cases it is preferable, according to the present invention, to add to the catalytic mixture a small amount of a substance which has a greater affinity for either the acidic or basic component of the catalyst than does the other component of the catalyst. For example, in a catalyst composed of a small amount of chromic oxide and a large amount of alumina the strengthening should be effected by the addition of a few percent of boric acid followed by the heating step, rather than by heating the catalyst itself without any addition.

Where the catalyst initially contains only a large amount of a substance of basic character, a small amount of an acid substance should be added before the heating step. Where the catalyst initially contains only a large amount of a substance of acid character, a small amount of a basic substance is added prior to the heating step. In cases where the catalyst contains a large amount of an amphoteric oxide, the added minor component is preferably acidic. For example, alumina may be combined either with phosphoric or with boric acid. Where the catalyst initially contains neither, or contains substances of either or both types which will not react with another substance to form a compound of the required high melting point, both types of substances must be added in small amounts.

It has already been proposed to produce catalysts for the methane-steam reaction by saturating a difficulty reducible oxide with nickel nitrate, drying the mixture, roasting it to decompose nickel nitrate to nickel oxide and reducing it to convert nickel oxide to metallic nickel. An alternative procedure is to mix a solution of a nickel salt with a solution of a salt of a metal capable of forming a difficultly reducible oxide simultaneously precipitating the hydroxides of the two metals, drying the mixture and reducing at an elevated temperature to produce a metallic nickel in the mixture. In either case neither the roasting nor reducing step is a heating step of the type contemplated for the strengthening of the catalyst according to the present invention. The roasting and reducing steps are ordinarily carried out at a temperature not substantially in excess of 600° C.

The reactions by which the high melting compound contemplated by the present invention is produced do not ordinarily occur at such temperatures but require the employment of temperatures upwards of 1600° F. Since the present invention finds its greatest field of application in the production of pilled catalysts in which it is impossible to employ materials of high mechanical strength, such as pumice, etc., the process of the present invention usually comprises both the roasting and the reducing steps of the conventional method and in addition a molding step and a high-temperature strength-increasing heating step. Of course, the roasting step may be omitted but it is preferably included prior to the molding step so as to eliminate water and decomposition gases, such as $NO_2$, during the heating of the molded catalyst. The reducing step is usually conducted after the high temperature heating step. Furthermore, the high temperature heating step may be conducted in an inert or reducing atmosphere where the catalytically active ingredient is one which loses activity when heated to a high temperature in the presence of air.

It has also been proposed for the methane-steam reaction to produce a catalyst by reacting a nickel salt with a metal acid to form a nickel metallate. Lest this procedure be confused with the procedure according to the present invention, it is pointed out that this reaction is ordinarily carried out in water solution at a relatively low temperature and that the nickel metallate formed is and must be decomposed during the roasting step since the nickel must be present in the metallic state in order to be effective for this reaction.

It is not precisely known what change occurs during the heating step to account for the increase in strength. It may be that one reaction component melts at the temperature employed and combines with the other component thereby setting up a bond between the particles of the catalyst. On the other hand, the temperature may be sufficiently high that the compound formed by the reaction of the two components may fuse and form a physical bond between the other components of the catalyst. Again, in view of the fact that the components in many instances melt at temperatures much higher than the treating temperature, it may be that the components react in the dry state and in this way exert a binding effect.

Whatever be the explanation, it is a fact that where the two reaction components are present and the mixture is heated to a high temperature, usually in excess of 1700° F. but not necessarily in excess of the melting point of the compound which may be formed by the reaction between the said components, for a sufficient length of time, the strength of the catalyst is materially increased.

In order that the improved results of the present invention may be obtained it is essential that the catalyst composition, prior to the high temperature step, contain a catalytically active ingredient in a minor proportion, an acidic or basic substance, acting as a carrier, in a major proportion and a small amount of an inorganic substance capable of reacting with the major component to form a high melting compound. Moreover, where the effective ingredient is itself capable of reacting with the major component the inorganic substance must be one which has a greater affinity for the major component than does the catalytically effective ingredient.

Our invention will be more completely understood from the following specific examples which are submitted purely for illustrative purposes and not for the purpose of defining the scope of our invention:

Example I 1455 parts by weight of nickel nitrate hexahydrate were dissolved in 500 parts of water, to which 22 parts of boric acid were added. 750 parts of magnesium oxide were then slowly added to the solution, with stirring, and the resulting paste was dried and heated at about 850–900° F. to convert the nitrates to oxides and to drive off oxides of nitrogen. The heated powder was passed through a 10 mesh screen and was then formed into a dense mass by compression under high pressure. This is suitably done in a tablet machine, using pressures of the order of 10,000 pounds per square inch or higher. The tablets first formed may be made even stronger by being crushed to about 10 mesh and then again formed into tablets. The tablets resulting from this double operation are then heated to a temperature of 1700 to 2000° F. or higher for about 36 hours. The nickel oxide in the tablets is then reduced to metallic nickel by passing hydrogen over them for about six hours at the same or any desired lower temperatures. The resulting tablets are highly active catalysts for the production of hydrogen by the reaction of methane and steam, a gas containing 0.9% methane being obtained on passing 250 volumes of methane per hour and excess steam over the tablets in an externally heated reaction tube maintained at 1525° F.

The strength of the tablets thus prepared is much greater than tablets prepared in the same manner but without the addition of the boric acid. A comparison of the minimum pressure required to crush the tablets, with and without the addition of boric acid, is given in the following table:

|  | Strength of tablets (pounds per square inch) | |
| --- | --- | --- |
|  | Before heating | After heating |
| Tablets with 2% boric acid | 1020 | 4150 |
| Tablets without boric acid | 700 | 1890 |

Example II

In order to demonstrate the manner in which catalysts employed according to the present invention are superior in stability to catalysts previously employed, tests were made on a nickel magnesia catalyst of the type described in the first example containing different strength increasing additions. The strength of these catalysts was measured before heating, after heating for several hours at 1700° F. and after use in the methane steam reaction for a given period at a temperature between 1500° and 1700° F. The catalysts were all employed as pills of the same size and shape. The crushing force was measured as pounds per pill. The following results were obtained:

| Catalyst | Before heating | After heating | After use |
| --- | --- | --- | --- |
| Ni–MgO | 25 | 22 | 16 |
| Ni–MgO+2% H$_3$BO$_3$ | 23 | 35 | 36 |
| Ni–MgO+5% NaF | 20 | 42 | 77 |
| Ni–MgO+4% H$_3$PO$_4$ | 20 | 31 | 38 |

Example III

The nickel magnesia catalyst of the preceding example when heated at 2100° F. for 20 hours had a strength of 15 lbs. per pill. Two per cent of boric acid added to the pills in the manner described increased the strength after the same heating step to 97 lbs. per pill. Ten per cent of boric acid increased the strength to 82 lbs. per pill. Two per cent of cobalt oxide increased the strength to 57 lbs. per pill. One-half per cent of sodium fluoride increased the strength to 60 lbs. per pill. Two per cent of sodium fluoride increased the strength to 77 lbs. per pill. Four per cent of phosphoric acid increased the strength to 38 lbs. per pill.

Example IV

In order to determine the effect of time of heating and temperature of heating on the strength of the catalyst produced, a nickel magnesia catalyst of the composition set forth in Example I containing 2% of boric acid was heated at successively higher temperatures for 20 to 22 hours and the strength of the pills after each heating step was measured. The results were as follows:

| Temperature | Initial strength | After heating |
| --- | --- | --- |
| 1600 | 1020 | 2160 |
| 1800 | 1020 | 4100 |
| 2000 | 1020 | 5450 |

In this table strength is given as pounds per square inch.

The same catalyst was heated for different periods at two different temperatures. The results were as follows:

| Hours | 1800° F. | 2000° F. |
| --- | --- | --- |
| 12–14 | 1860 | 3650 |
| 20–22 | 3100 | 5100 |

Example V

A catalyst mixture composed of 4% of chromium oxide, by weight, and 96%, by weight, of alumina obtained by saturating alumina with the required amount of a solution of chromium nitrate and roasting at about 350° F. is mixed with 1% of graphite and 2% of boric acid and compressed into pills. The pills, when heated for 20 hours at 1500° F. had a strength, under compression, of 103 lbs./sq. in. The same pills, when heated for 20 hours at 1800° F. had a strength of 1800 lbs./sq. in. Should the pills acquire a pink color in this step they suffer a substantial loss in catalytic activity. In order to prevent the occurrence of the conversion to which the pink coloration is due, the heating step, when temperatures upwards of 1800° F. are employed, should be conducted in an atmosphere of hydrogen, nitrogen, methane, or other reducing or inert gas. This catalyst exhibits satisfactory activity in the dehydrogenation of hydrocarbons at a temperature of about 1000° F.

Example VI

A catalyst mixture composed of 1 molecular weight of chromic oxide and 150 grams of magnesia has added to it 1% of graphite and 2% of boric acid and is pilled. The pills, upon being heated for 20 hours at 1500° F. show a resistance to pressure of 1375 lbs./sq. in. When heated for 20 hours at 1700° F. the pills show a resistance to pressure of 2670 lbs./sq. in. When heated at 2000° F. for 20 hours the pills show a resistance to pressure of 5400 lbs./sq. in. When the content of magnesia in the catalyst is doubled and the pills are heated at 1700° F. for 20 hours the resistance to pressure is 3130 lbs./sq. in. This catalyst is also suitable for use in the dehydrogenation of hydrocarbons when care is taken to avoid a pink coloration during the heating step.

Having thus described the nature and objects of our invention and illustrated the same by practical embodiments which obviously do not define the limits of our invention, what we claim as new and useful and desire to secure by Letters Patent is:

A process for the production of a catalyst adapted to catalyze the reaction between hydrocarbon and steam at temperatures between 900 and 1500° F., which comprises forming an intimate mixture of nickel, a large portion of magnesium oxide and a minor portion of boric acid, forming the mixture into pellets and heating the pellets at a temperature of at least 1600° F. for a number of hours to materially increase the mechanical strength of said pellets.

WILLIAM J. SWEENEY.
WILLIAM E. SPICER.